Figure 1:
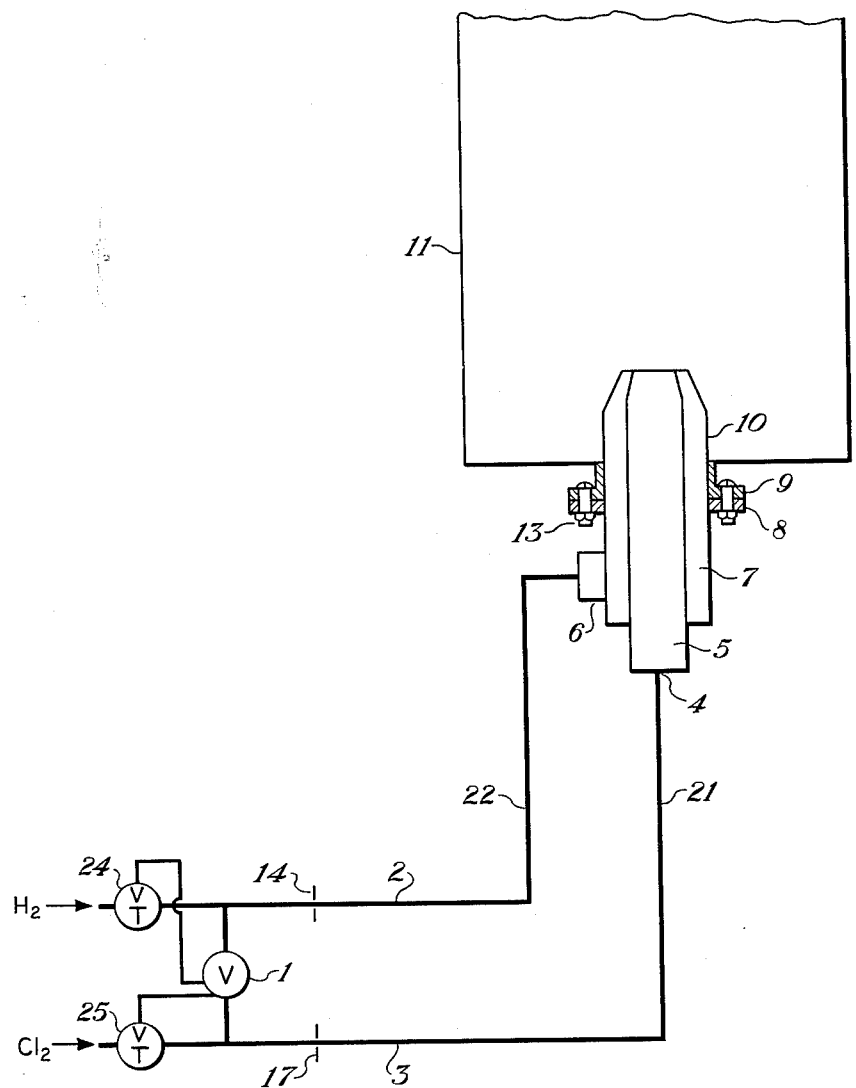

United States Patent Office 3,097,073
Patented July 9, 1963

---

3,097,073
HYDROGEN CHLORIDE PRODUCTION SYSTEM
Joseph M. Hildyard and Haldred C. Breckon, Youngstown, N.Y., assignors to The Hooker Electrochemical Company, Niagara Falls, N.Y., a corporation of New York
Filed Nov. 29, 1957, Ser. No. 699,761
1 Claim. (Cl. 23—277)

This invention relates to an improved apparatus for the manufacture of hydrogen chloride.

The present invention resides in an apparatus having an improved burner nozzle for controlling the pressure of gases supplied to the burner.

In the manufacture of hydrogen chloride from hydrogen and chlorine, precaution should be taken in the control of these gases since a large excess of either in the combustion chamber or burner could cause the existence of an undesirable condition. Also variations in the quantity of the gases added will alter the purity of the end product. It is highly desirable to supply to the system some gauging means so that the control of gases may be measured, and some adjusting means so that the flow of the gases may be regulated. To realize good regulation and accurate measurements under varying conditions of load and operating pressure, extreme care must be used in the design of the metering system and its environmental piping. In order to produce a good product under varying conditions of burner pressure and hydrogen chloride production rates, it is desirable and beneficial to have equal pressure drops across the hydrogen and chlorine metering elements, and to have little or no pressure drop across the piping between the flow measuring elements and the combustion space.

The heretofore used apparatuses required ejecting the chlorine at approximately seven times the velocity of the hydrogen and adding hydrogen in a commensurate amount so as to insure complete reaction of the chlorine. The quality of the final hydrogen chloride product was difficult to control because of the greatly different pressure drops of the hydrogen and chlorine across their respective conduits. A somewhat equal pressure drop throughout the system and also means for effectuating low pressure drops would make quality control of the final hydrogen chloride product much more accurate.

It is one object of this invention to supply a burner nozzle for a hydrogen chloride production system which will provide for low pressure drops.

It is another object of this invention to provide a hydrogen chloride system with equal gas pressure drops downstream from the metering elements.

Another object is to design a system so that a very high percentage of the pressure drop occurring between the flow regulating valves and the compustion space would occur across the metering elements.

A further problem that exists in apparatuses for making hydrogen chloride is the mixing of hydrogen and chlorine to insure complete reaction of the minor component. The prior art required adding a large excess of hydrogen to the system so as to insure substantial reaction of the chlorine. It is a further object of this invention to provide a nozzle which will provide better mixing and more complete combination of the two gases so that neither gas need be added in such an excessive amount.

A still further object of this invention is to provide a nozzle for this type system which will eject the two gas streams at nearly equal velocities by having the terminal area of the hydrogen annular conduit equal in area to the terminal part of center chlorine conduit.

It is important to this invention that the terminal area of the center conduit be approximately equal to the terminal area of the annular conduit. The hydrogen chloride producing system has in combination a burner, a source of hydrogen, a source of chlorine, gas ratio controlling means and a burner nozzle, the nozzle comprising in combination two conduits, one enclosing the other, a gas inlet for the outer conduit, and a gas inlet for the enclosed conduit. It is preferred to put the burner securing means around the outer periphery of the outer conduit means. The conduits of the nozzle terminate so as to form a tapered end opening, both conduits tapered in such a manner that their angle inclines effectuate a "vena contracta." A "vena contracta" is a low pressure area formed from the discharging jet of gas at center of cone created by the ejected gas. The gas inlets to the nozzle may be located at various points; however, the preferred positions are those described above and shown in the drawings below.

Figure 3:
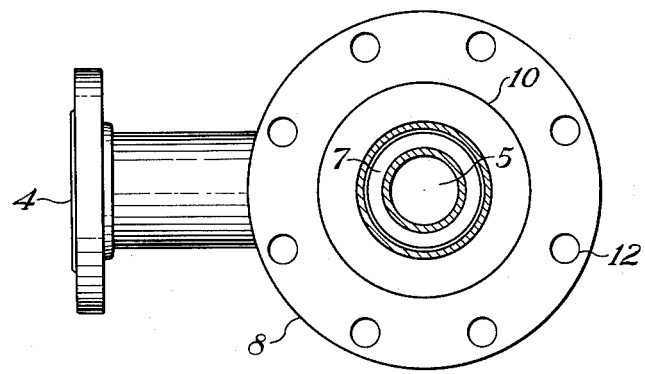
Figure 2:
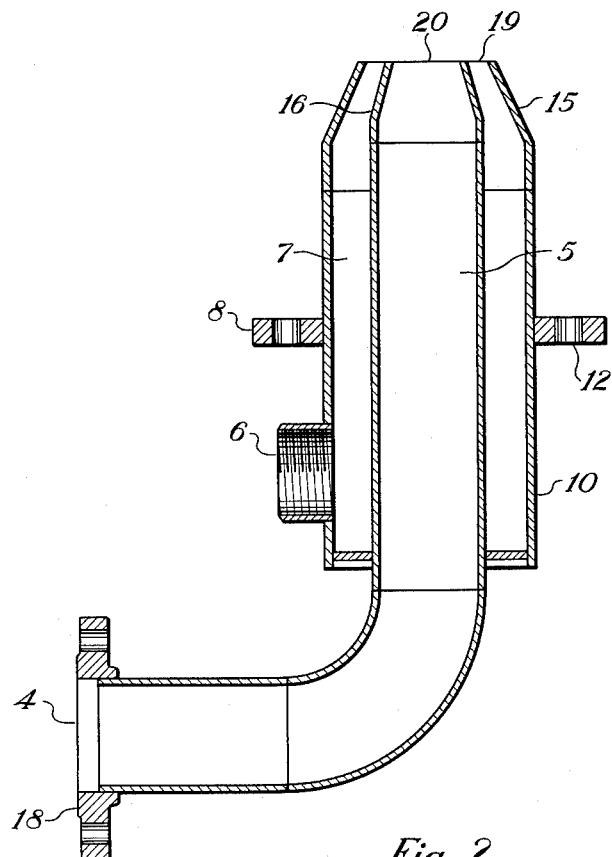

In order that the invention be more easily understood, it will be described with reference to the attached drawings. FIGURE 1 is a diagrammatic illustration of the flow system including gas sources, orifices, burner and nozzle, and flow regulating valves. FIGURE 2 is a side view of the nozzle of this invention. FIGURE 3 is a front view of the nozzle of this invention.

Referring first to FIGURE 1; ratio controlling means 1 measures gas flow and operates flow regulating valves 24 and 25 through valving means which control desired hydrogen and chlorine addition rates. Hydrogen lead 2 passes hydrogen and chlorine lead 3 passes chlorine at a measured rate which is ideally a molecular flow ratio of 1:1. The hydrogen gas enters the nozzle 10 at point 6 where it flows into hydrogen annular conduit 7. The chlorine gas enters the nozzle at point 4 where it flows into center chlorine conduit 5. Flange 8 is secured to the nozzle 10 by any convenient means, apertures 12 as shown in FIGURES 2 and 3, being located in flange 8 so that bolts or other securing means may be inserted to connect the nozzle to the burner chamber 11. Flange connector 9 is located at the bottom of the burner so as to provide means to which the flange 8 may be attached. Orifices 14 and 17 are used to measure the various rates of the gases added. It should be understood that any equivalent rate meter may be used in place of the orifices. Flange 18 as shown in FIGURES 2 and 3, is adapted to secure chlorine lead 16 to a source of chlorine 3 in a gas tight manner. Flange 18 is located on the portion of center conduit 5, extending out beyond enclosing conduit 10. The wall thickness of both conduits 15 and 16 are approximately equal. The terminal areas 19 and 20 are approximately equal. Gas leads are shown at 21 and 22.

Referring now to FIGURES 2 and 3, and in particular the nozzle, the gases are added so that they enter nozzle 10 at points 4 (for chlorine) and 6 (for hydrogen). The area of hydrogen annular conduit terminal 19 is approximately equal to the terminal area 20 of center chlorine conduit 5. This is critical to the invention in that it is desired to eject the two gas streams at nearly equal velocities by having terminal point of the annular hydrogen conduit 7 equal in area to the terminal point of center chlorine conduit 5. By ejecting the gases at nearly equal velocities and at a tapered terminal, a "vena contracta" or a low pressure area is formed at center of cones created by the ejecting gases. The low pressure resulting at this point causes a more intimate mixing of the gases. By using wider conduits and tapered ends 15 and 16, smaller pressure drops in the gases are effected. This is quite desirable since a high pressure drop makes it quite difficult to measure and adjust the amounts of gases originally entering the system, as shown in FIGURE 1 at 2 and 3. The tapered portions 15 and 16 which terminate substantially on the same plane allow for a more constant existing pressure downstream from the metering elements, and also effect better and more complete mixing of the ingredient gases. The combination of wider conduits and more tapered nozzles produces smaller pressure drops than heretofore, and permits drops that become relatively insignificant to the metering problem. As shown in FIGURE 1, FIGURE 2 and FIGURE 3, nozzle 10 is provided with an apertured flange 8 adaptable to be connected to burner 11. Any type of connecting means may be used, however, we have found that the flange 8 illustrated in the drawing is preferred. Flanges 8 and 18 may be replaced if desired by any equivalent securing means.

The material out of which these above mentioned conduits are made is of critical importance to the invention. Many materials have a tendency to corrode and deteriorate upon contact with hot vapors or gases. Also, it is essential to the invention that metals which will not corrode and plug or hinder the passage of gases be used. It has been found that steel for the hydrogen conduit or pipe and nickel for the chlorine conduit gave the best performance of the materials we tried. Good results were also obtained when we used nickel for both the chlorine and hydrogen conduits.

The drawings and the above description of this invention define the center conduit as the chlorine conduit, and the annular conduit as the hydrogen conduit. However, it would not depart from the spirit of this invention to use the center conduit as the hydrogen conduit, and the annular conduit as the chlorine conduit.

Although we have described the limitations of my invention, similar modifications and variations will suggest themselves to persons skilled in the art upon reading this disclosure. These are intended to be comprehended within the spirit of this invention.

We claim:

In the continuous combustion of gaseous hydrogen and gaseous chlorine to produce anhydrous hydrogen chloride, an improved apparatus means comprising a burner chamber, a burner nozzle secured to said chamber, separate gas supply means in communication with said nozzle for supplying gaseous hydrogen and gaseous chlorine to separate zones in said nozzle, and automatic ratio controlling means and, in communication therewith controlled valve means in each of said separate gas supply means, said ratio controlling means and said valve means being adapted to regulate the flow of each of said gases in substantially a one to one molar ratio to said nozzle under varying-demand rates by automatically measuring and controlling gas flow in each of said gas supply means, said nozzle comprising two cylindrical conduits, one inside the other in annularly spaced relationship with the inner conduit being made of nickel and forming a separate central zone, the gas-receiving end of the inner conduit being in separate communication with the chlorine gas supply means and the same end of the outer conduit being connected to the said inner conduit in a gas tight manner, thereby forming a separate annular zone and being in separate communication with the hydrogen gas supply means, and the gas-ejecting ends of each of said conduits tapering inwardly, terminating on substantially the same plane, in open communication with the burner chamber, and having the terminal area of the inner conduit approximately equal to the terminal annular area of the outer conduit whereby said nozzle is adapted to eject both of the said gases into the said burner chamber at substantially equal velocities without premixing and with substantially complete mixing after the gases leave the nozzle.

References Cited in the file of this patent

UNITED STATES PATENTS

| | | |
|---|---|---|
| 1,680,833 | Willcox | Aug. 14, 1928 |
| 1,893,533 | Barber | Jan. 10, 1933 |
| 1,905,432 | Bauer | Apr. 25, 1933 |
| 1,953,590 | Cone | Apr. 3, 1934 |
| 2,360,548 | Conway | Oct. 17, 1944 |
| 2,515,158 | Turpin et al. | July 11, 1950 |
| 2,713,894 | Sage | July 26, 1955 |
| 2,725,933 | Gaucher | Dec. 6, 1955 |
| 2,767,785 | Eastman et al. | Oct. 23, 1956 |
| 2,823,740 | Morck | Feb. 18, 1958 |
| 2,836,233 | Schoenmakers et al. | May 27, 1958 |

FOREIGN PATENTS

| | | |
|---|---|---|
| 540,449 | Belgium | Aug. 31, 1955 |

OTHER REFERENCES

Fuels and Their Combustion, Haslam and Russell, page 301.